Sept. 8, 1942.    H. THOMASON    2,295,061
BRAKE SHOE GRINDING MACHINE AND GAUGE
Filed Aug. 25, 1939    5 Sheets-Sheet 1
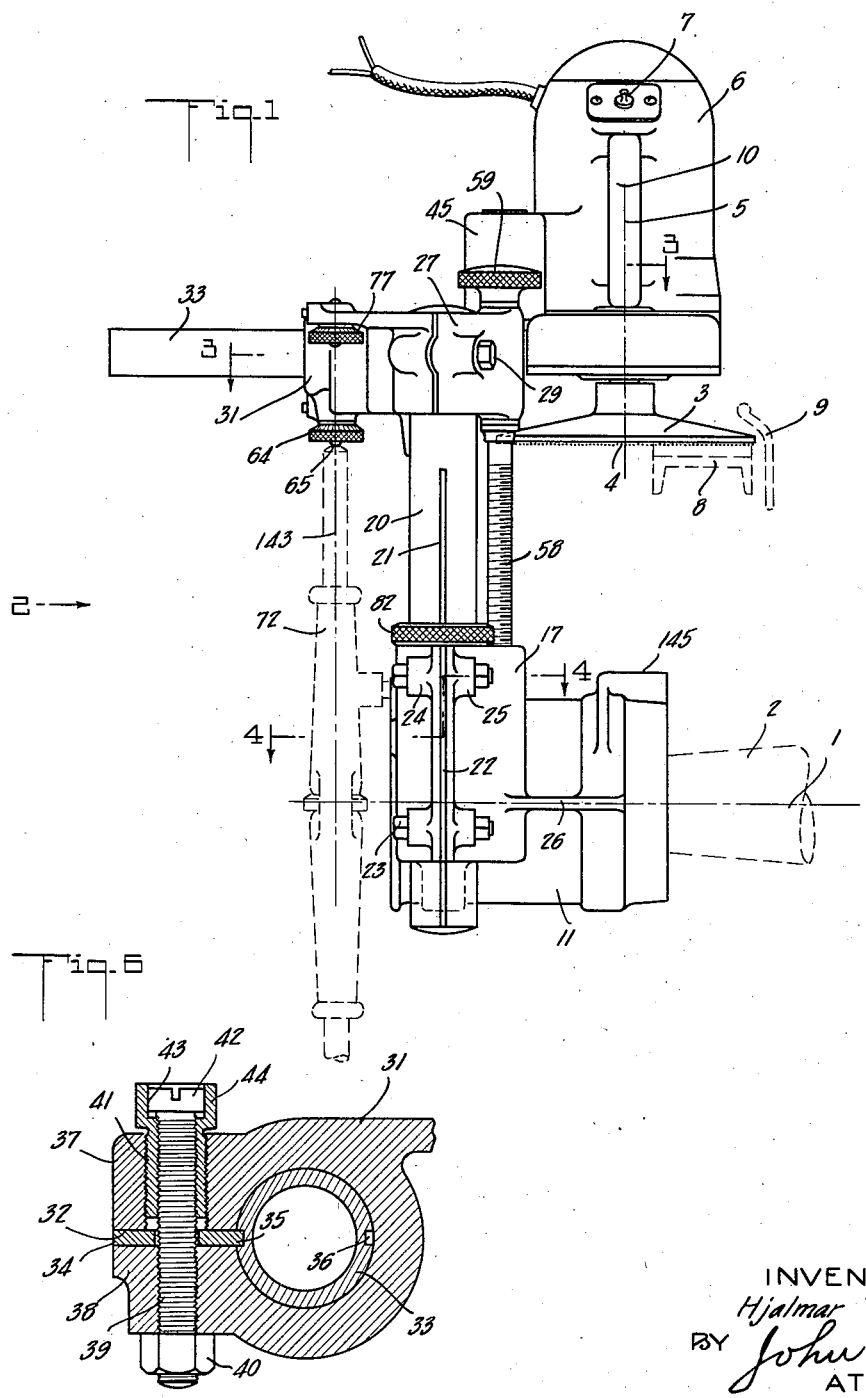
INVENTOR
Hjalmar Thomason
BY John Flam
ATTORNEY

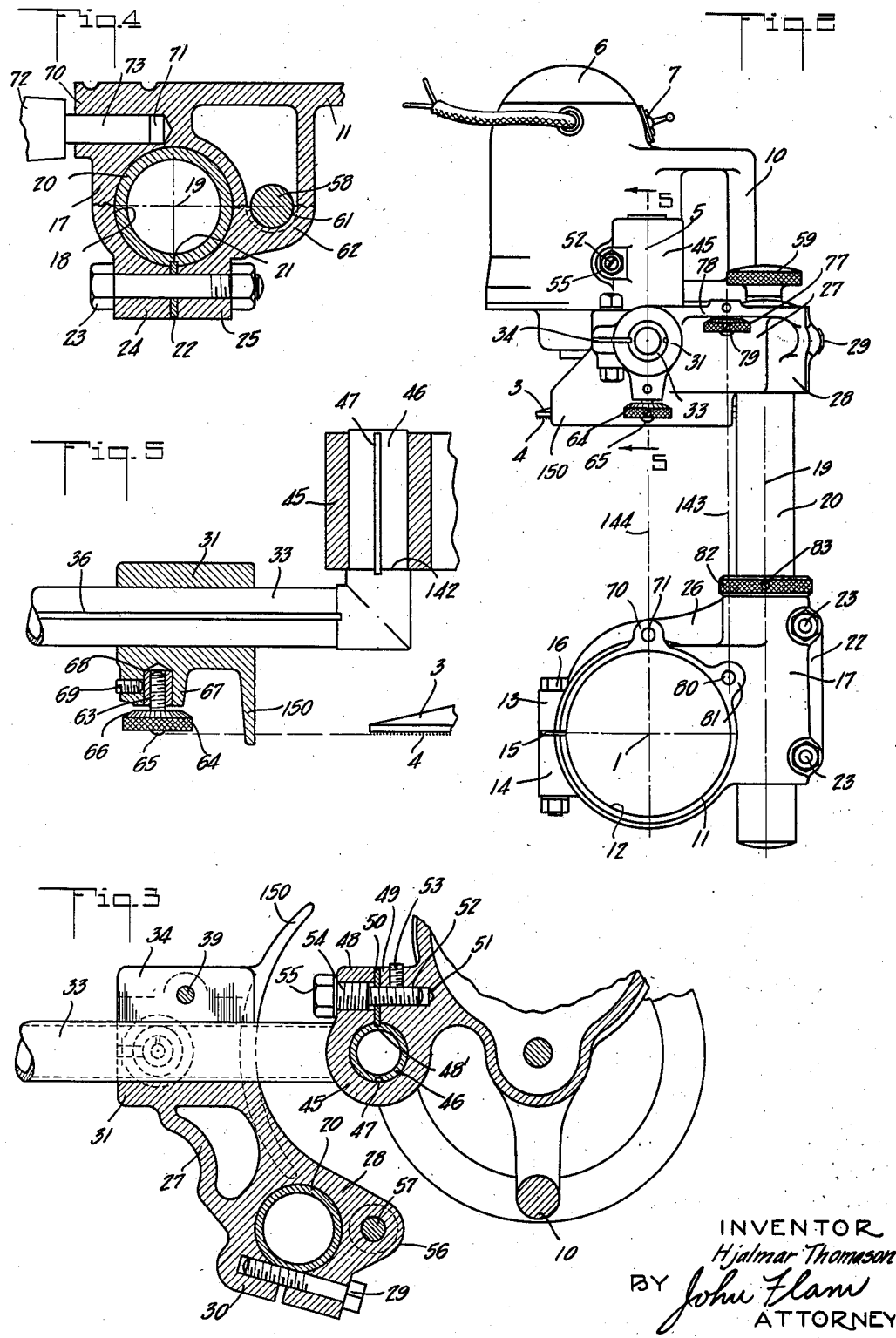

Sept. 8, 1942. H. THOMASON 2,295,061
BRAKE SHOE GRINDING MACHINE AND GAUGE
Filed Aug. 25, 1939 5 Sheets-Sheet 3
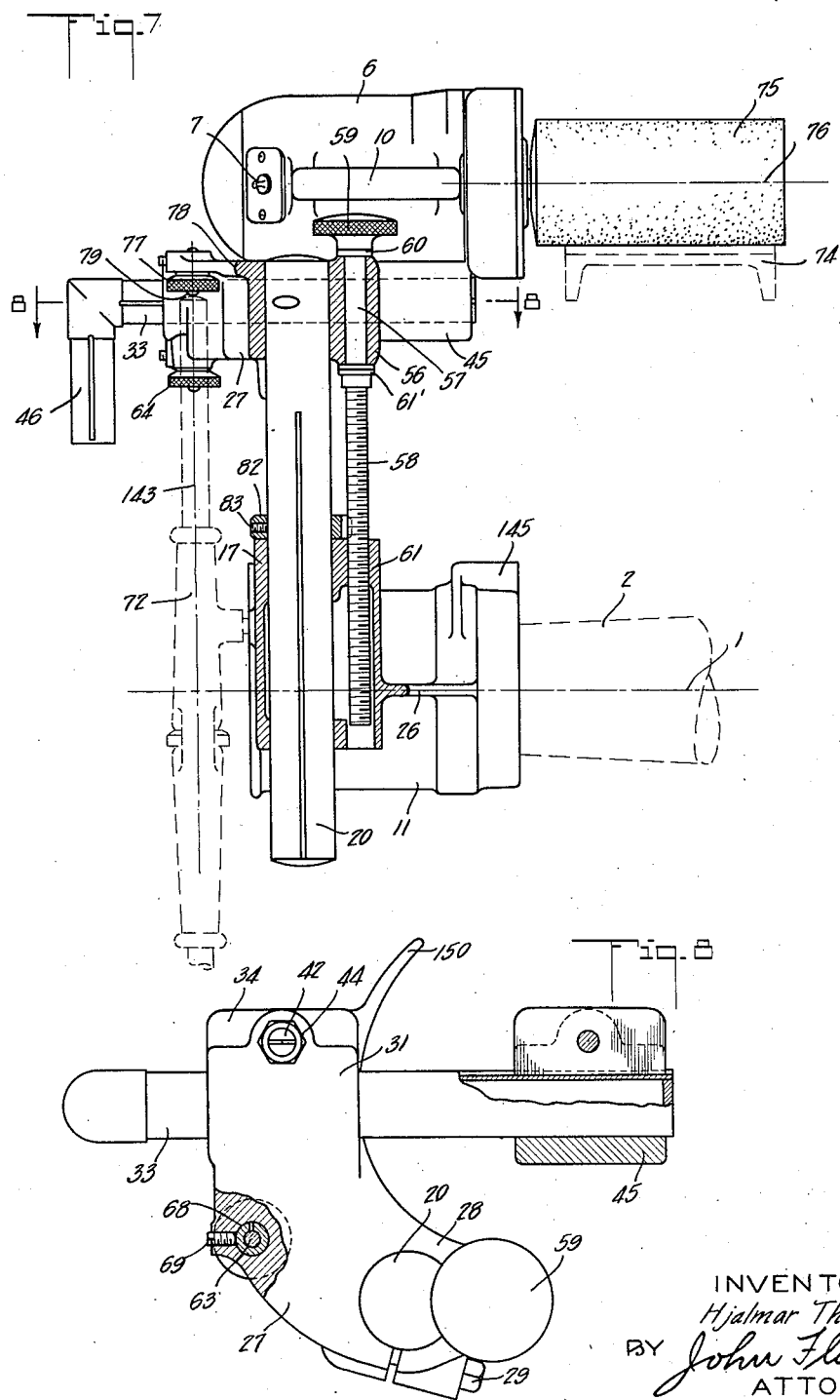
INVENTOR
Hjalmar Thomason
BY John Flam
ATTORNEY

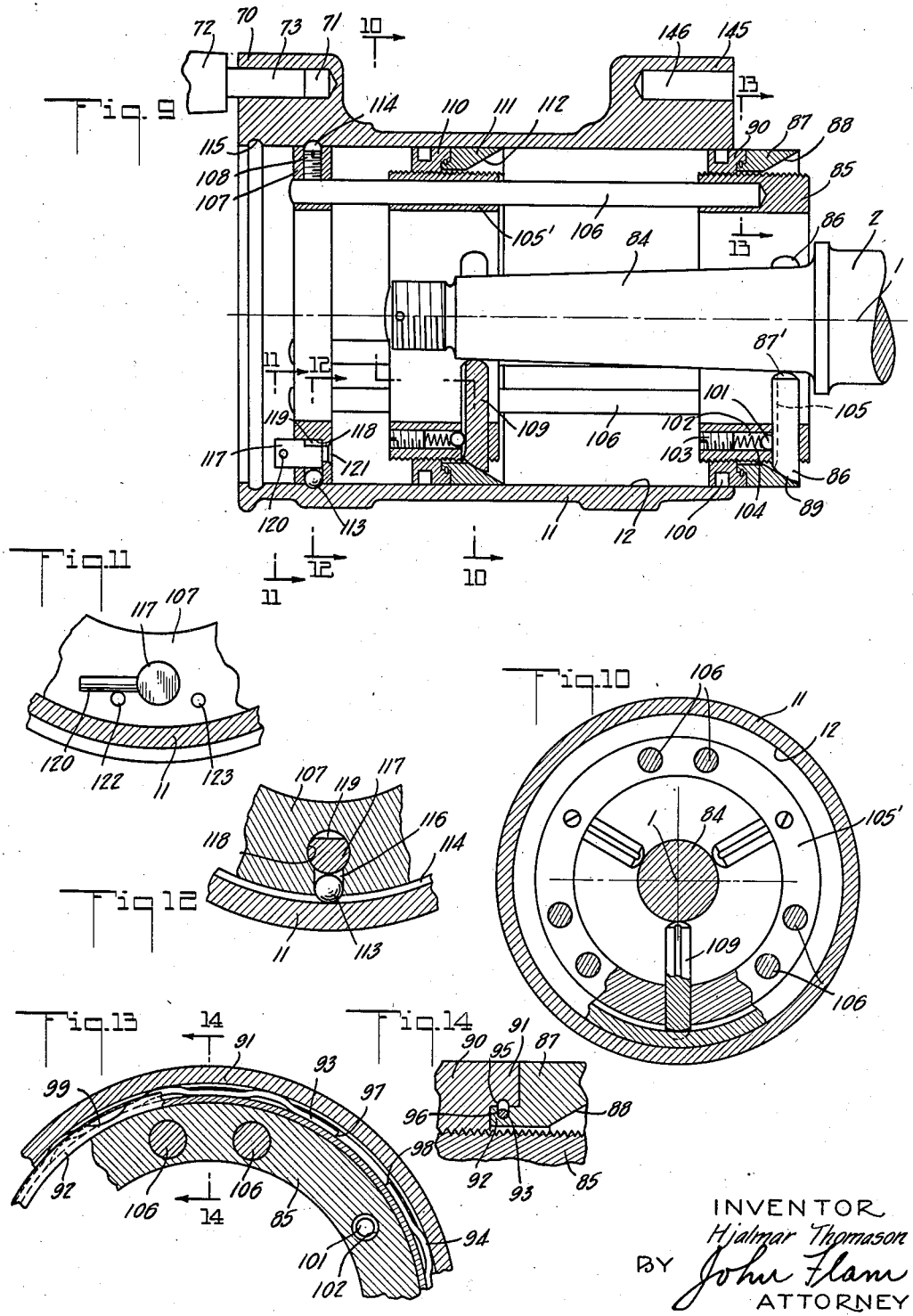

Sept. 8, 1942.                    H. THOMASON                    2,295,061
                    BRAKE SHOE GRINDING MACHINE AND GAUGE
                    Filed Aug. 25, 1939          5 Sheets-Sheet 5
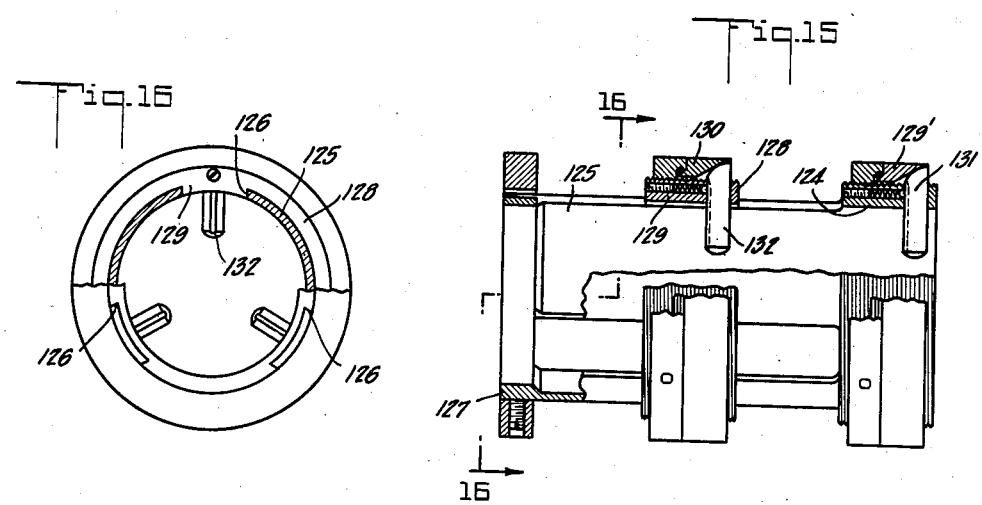
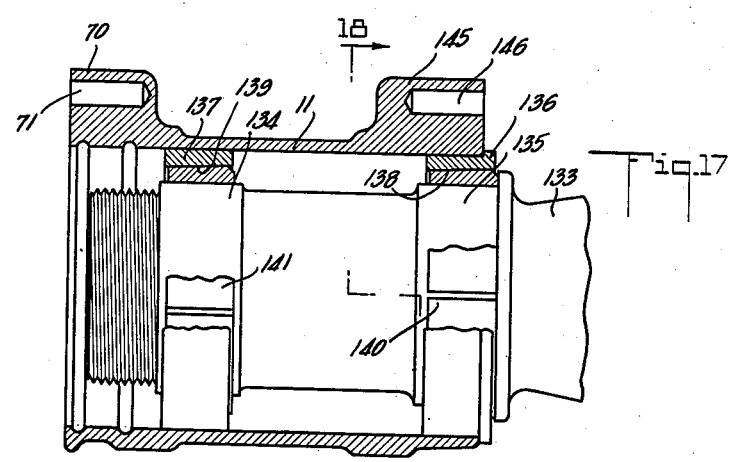
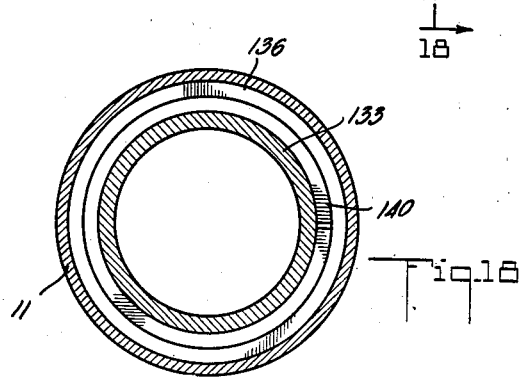
INVENTOR
Hjalmar Thomason
BY John Flam
ATTORNEY Patented Sept. 8, 1942

2,295,061

UNITED STATES PATENT OFFICE 2,295,061

BRAKE SHOE GRINDING MACHINE AND GAUGE

Hjalmar Thomason, Los Angeles, Calif.

Application August 25, 1939, Serial No. 291,929

11 Claims. (Cl. 51—241)

This invention relates to a machine for grinding brake shoes such as are used on wheels for automotive equipment; for example, for pleasure cars, busses or trucks.

Brake shoes as commonly provided, are arranged to engage frictionally with an internal cylindrical brake drum surface. Due to the frictional engagement, wearing of the brakes and of the brake drums is a necessary incident. Reconditioning of the brakes is required in time. This requires in most instances, truing of the brake drums, as well as relining the shoes, because the drums in service have become worn and scored. Often some drums are scored, and others not; and the drums seldom wear evenly. For this reason, the drums for any vehicle are not likely to be trued to the same diameter. The brake lining to be placed over the shoes is not obtainable in sufficient variety of thicknesses to accommodate the various drum diameters after the drums are turned. Therefore, it is necessary to use an oversize lining and then to trim the shoes down to the diameter of the drum in which the shoes are to work. It is advantageous to trim the shoes while they are in working position upon the axle of steering spindle.

It is one of the objects of this invention to accomplish this as by a grinder mechanism that is arranged to be angularly moved about the axis of the wheel associated with the brake mechanism. By mounting the grinder mechanism upon a support rotatable about this axis, an operator can cause the grinder wheel (either a disc or of roller form) to traverse the brake shoe lining surfaces.

It is another object of this invention to make it possible in a simple manner to support the grinder mechanism for angular movement about the brake axis.

It is still another object of this invention to make it possible to support the same angularly movable grinder mechanism in connection with wheel axles of widely varying sizes, such as are encountered in connection with light cars as well as heavy coaches or trucks.

It is still another object of this invention to facilitate the setting up of the grinder mechanism in operative relation to the brake shoes.

In grinding brake shoes from the axle as well as the steering spindle, the position of the brake shoes in relation to the machined surface on which the grinder may be mounted at times vary greatly. By the aid of this invention, the trimming or grinding element may readily be properly positioned with respect to the shoes to be trimmed.

In using the grinder, a pin gauge may be used to take a measurement of the cooperating brake drum diameter. This pin gauge measurement may then be readily transferred to the grinder mechanism. However, due to the coarse grinding surface of the grinder wheel or disc, and the fact that the grinding wheel or disc seldom runs true, it is not practical to do the gauging operation upon such a surface, because an accurate and uniform setting of the grinder cannot be obtained, making it necessary to adjust the brake shoes to the proper drum clearance after they are ground. Accordingly, by the aid of this invention, the pin gauge is made operative not only upon the grinding wheel or disc, but also upon a metal surface, such as a hardened button. It is thus still another object of this invention to provide a smooth, accurate surface for the gauging operation, in lieu of, or as a substitute for, the grinding surface. It is thus possible to set the grinder so accurately that no adjustment to the shoes is necessary to obtain proper clearance between the brake shoe and drum after grinding. A further advantage of this construction is that the gauging may be checked while the grinder is mounted on the axle or spindle.

A disc grinder is usually employed in this mechanism for grinding narrow brake shoes. In such an operation, the disc is rotated on an axis radial to the axis of the brakes. When wide shoes are to be ground, the difference in linear velocity of the grinding surface, of the disc, corresponding to the different radii from the axis to the edge of the disc, may be intolerable for accurate work. Accordingly a roller type of grinder should be used, the axis of the roller being parallel to the axis of the brake shoes. It is another object of this invention to facilitate a change from disc to roller; and furthermore to provide corresponding metal gauging surfaces for either form of grinding wheel.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

Referring to the drawings:

Figure 1 is a side elevation of an embodiment of the invention in operative relation with an automatic axle;

Fig. 2 is a front elevation of the apparatus illustrated in Fig. 1;

Fig. 3 is a fragmentary sectional view, taken along plane 3—3 of Fig. 1;

Fig. 4 is a fragmentary sectional view, taken along plane 4—4 of Fig. 1;

Fig. 5 is a fragmentary sectional view, taken along plane 5—5 of Fig. 2;

Fig. 6 is an enlarged detail section illustrating the manner in which certain of the parts may be assembled;

Fig. 7 is a part sectional view, similar to Fig. 1, illustrating the apparatus adapted to utilize a roller grinder wheel;

Fig. 8 is a fragmentary sectional view taken along plane 8—8 of Fig. 7;

Fig. 9 is an enlarged sectional view illustrating the chucking device for supporting the grinding apparatus in an angularly movable manner;

Fig. 10 is a sectional view, taken along plane 10—10 of Fig. 9;

Fig. 11 is a fragmentary detail view, taken along plane 11—11 of Fig. 9;

Fig. 12 is a detail sectional view, taken along plane 12—12 of Fig. 9;

Fig. 13 is a fragmentary sectional view, taken along plane 13—13 of Fig. 9;

Fig. 14 is an enlarged fragmentary sectional view, taken along plane 14—14 of Fig. 13;

Fig. 15 is a view partly in section, similar to Fig. 9, but illustrating a modified form of the chucking device;

Fig. 16 is a sectional view taken along plane 16—16 of Fig. 15;

Fig. 17 is a view similar to Fig. 15, but of a further modified form of the chucking device; and Fig. 18 is a sectional view, taken along plane 18—18 of Fig. 17.

In Figs. 1 and 2 the grinder mechanism is illustrated as being rotatable about the axis 1 of an automobile axle 2. In this apparatus there is indicated a grinder disk 3 shown as carrying an abrasive disk 4. Other forms of rotary cutting members, however, may be utilized. The axis 5 of the disk 3 is shown in this instance as radial to the axis 1 of the axle 2. Rotation of disk 3 about its axis 5 is accomplished by the aid of an appropriate source of power, such as a small electric motor 6, which may be appropriately coupled to the shaft of the wheel 3 as through gears. The circuit for electric motor 6 may be controlled by a conventional tumbler switch 7 mounted in a convenient location on the motor frame.

The apparatus is shown as used for grinding the surfaces of the lining upon the brake shoes 8 associated with the axle 2. In the present instance these brake shoes 8 are shown as of the narrow type. A dust shield 9 is also indicated in Fig. 1, overlapping the inner edge of the brake shoe 8. The disc 3, however, has a sufficiently thin edge to enter beneath the overhanging portion of this dust shield.

The apparatus is so arranged that an operator can grasp the handle 10 on the frame of the motor 6 and rotate the grinder about the axis 1, so as to grind the plurality of brake shoes to form a proper cylindrical exterior surface on the lining. The manner in which the grinder motor 6 and its associated disk 3 are mounted for angular movement by the aid of axle 2 will be described hereinafter.

Provisions are made for adjusting the grinder disk in a direction radial to the axis 1, so as to adjust the radius to which the exterior surface of the brake shoes 8 is ground. In order to describe this structure, the supports for the motor 6 will now be described.

The main support for the entire structure includes a shell 11 (Figs. 1, 2, 9 and 10). This shell has an internal truly cylindrical surface 12 which forms a journal surface on an appropriate cylindrical support joined to the axle 2 in a manner to be hereinafter described. This shell, as illustrated most clearly in Fig. 2, may be provided with bosses 13 and 14 separated by a split 15. Through the bosses a bolt 16 may be provided for adjusting the fit of the cylindrical surface 12 around a cylindrical guide.

The shell 11 is shown as formed integrally with a hollow guide 17 (Figs. 1, 2 and 4). This guide has an internal cylindrical surface 18, having an axis 19 that is parallel to the axis 5 of the grinder disk 3 but spaced therefrom, as indicated most clearly in Fig. 2. Within this cylindrical guide surface 18 a tubular post 20 is slidable. This post is shown as provided with a longitudinal key-way 21, in which a spline key 22 is engaged. The guide 17 is shown as split longitudinally, and key 22 is disposed in this split to cooperate with the key-way 20, and to constrain movement of the post 20 to an axial direction. This key is held appropriately in place by the aid of the bolts 23 passing through the opposed bosses 24 and 25. These bolts do not compress the guiding surface 18 about the hollow post 20, but instead the hollow post 20 is slidable with an accurate fit within this guide.

The shell 11 and the guide 17 may be formed with appropriate strengthening ribs 26, the combined guide and shell being preferably an integral thin casting, and machined to provide the appropriate fits described.

At the top end of the post 19 a supporting bracket casting 27 is secured. This bracket is shown to best advantage in Figs. 1, 2, 3 and 8. Thus the casting 27 is provided with a split cylindrical collar 28, firmly compressed upon the post 20, as by the aid of the bolt 29 passing across the split and threaded into the half 30 of the split elements. Thus the bracket 27 is firmly secured to the top of the tubular post 20.

This bracket 27 is provided with an integral collar 31 (Figs. 2, 3, 5 and 6). The collar 31 is split as indicated at 32 (Fig. 6) so that it may be compressed and firmly gripped upon a horizontal tubular supporting member 33 which passes through the collar 31. This member has an axis parallel to the axle 1.

In order to prevent rotation of the support 33 within the collar 31, a key member 34 is inserted within the split 32. Its inner edge is adapted to cooperate with either one or the other of the key ways 35 and 36 formed on opposite sides of the support 33. The motor 6 is attached to this support in a manner to be hereinafter described.

Since the motor 6 is optionally supported either in the radial position illustrated in Fig. 1, or in the position illustrated in Fig. 7, it is necessary to provide for ready adjustment of the support 33 within the collar 31, so that it may serve effectively to support the motor 6 in either position. The position of the support 33 may have to be reversed in the collar 31 to accomplish these results. It is for this reason that two keyways 35 and 36 are provided on opposite sides of the support 33. Furthermore, provisions are made to compress the collar 31 positively about the support 33 as well as positively to release the collar 31, to facilitate removal and reinsertion of the support. For this purpose the split halves 37 and 38 (Fig. 6) between which the key 34 is inserted are provided with a special tightening and loosening means which will now be described.

Thus as shown in Fig. 6, the lower half 38 has joined to it a bolt 39 which extends through a tapped hole in the upper half 37. For example, the bolt 39 may be threaded into the lower half, but other means for holding the bolt in place may obviously be used. A check nut 40 on the projecting bottom of the bolt 39 may be provided if desired to lock the bolt 39 in place. This bolt 39 also passes through an appropriate aperture in the key plate 34. Engaging in a tapped aperture formed in the top half 37 is a hollow screw 41. This hollow screw is internally and externally threaded. The internal threads cooperate with the threads of the bolt 39, and the exterior threads cooperate with a tap formed in the upper half 37.

If the threads 39 are right hand threads, then the exterior threads on hollow bolt 41 are left hand threads.

The manner of assembly of the device is as follows: The hollow bolt 41 is threaded into place in the upper half 37, by the aid of its head 44. This threading is accomplished by a left hand rotation because of the fact that the external threads of the bolt 41 are left handed. Then bolt 39 is screwed through the internal threads of the bolt 41, and into the lower half 38, while bolt 41 is held against turning by the aid of its head 44. The head 42 of the bolt 39 may be accommodated within the recess 43 formed in the head 44 of the hollow screw 41. Bolt 39 is turned down until the head 42 almost reaches the bottom of the recess 43; then the nut 40 may be applied.

In order to apply a tightening effect upon the halves 37, 38, the hollow bolt 41 can be turned in a right hand direction. This advances the bolt 41 downwardly on the bolt 39. This right hand direction of rotation of the external threads of bolt 41 exerts a force upon the upper half 37 in a downward direction, because of the left hand external threads on screw 41. Thus the external and internal threads of screw 41 produce a cumulative tightening effect.

Positively to loosen the collar 31 from the support 33, the upper half 37 is positively moved upwardly with respect to the lower half 38. This is accomplished by left hand rotation of the hollow bolt 41. Upon such left hand rotation, the upper half 37 is positively urged upwardly by the hollow bolt 41. It is apparent that bolt 39 serves as a stationary screw against which bolt 41 may react positively to move the upper half 37 in either direction.

The natural resilience of the metal forming the collar 31 permits positive separation of the halves 37 and 38 in this manner.

In the assembly of Figs. 1 and 2, the motor 6 is supported with the grinder axis 5 in radial position with respect to the axle axis 1. For this purpose the frame of the motor 6 is provided with an integrally formed collar 45 having a bore therethrough parallel with the axis 5. This collar 45 is adapted to be placed over right angle extension 46 of the support 33, as illustrated most clearly in Fig. 5. This extension 46 as shown most clearly in Fig. 3 is also provided with a pair of key-ways 47 and 48' on opposite sides of the extension 46. This extension may also be provided with a shoulder 142 upon which collar 45 may rest.

The collar 45 is split so that it may be firmly compressed about the extension 46. Thus the collar has a left hand half 48, and a right hand half 49. Between the halves and in the split is located the key 50 cooperating with either one or the other of the keyways 47—48'.

Since in this case also it is desirable to facilitate removal and replacement of the motor with respect to the extension 47, a similar clamping arrangement is provided as described in connection with the collar 31 of the bracket 27. This is shown most clearly in Fig. 3. Thus the right hand half 49 has a tapped aperture 51. In this aperture passes a right hand threaded bolt 52 corresponding to bolt 39 of Fig. 6. In this case this bolt 52 is held in place in the right hand half 49, as by set screw 53. A hollow bolt 54 has its internal threads cooperating with the bolt 52. Its external threads, which are left handed, cooperate with a tapped hole in the left hand half 48. The head 55 of the hollow bolt 54 as before may be provided with a recess to accommodate the head of the bolt 52. The pitches of the internal and external threads of bolt 54 serve cumulatively to urge the halves together, or apart, as described heretofore in connection with Fig. 6.

The bracket 27, joined to the top of the supporting post 20, and the bracket 45, joined to the frame of the motor 6, are so arranged that with the various keys appropriately accommodated in the corresponding keyways, the axis 5 of the disk 3 is radial to the axis 1 and its prolongation would intersect this axis 1.

An arcuate shield 150 is formed integral with bracket 27 and extends around a portion of the disc wheel 4.

The adjustment of the radial spacing between the abrasive disk 4 and the axis 1 is accomplished by the aid of a lead screw mechanism. Thus the bracket 27, as shown most clearly in Figs. 3 and 7, is provided with a boss 56 serving as a journal for a cylindrical portion 57 of the lead screw 58. Fastened to the upper end of this cylindrical portion is a thumb wheel 59. Collars 60 and 61' are carried by the lead screw 58 to prevent axial movement of the lead screw 58 with respect to the boss 56.

The lead screw projects downwardly and engages in a threaded aperture 61 which is formed in an integral extension 62 (Fig. 4) of the guide 17. The pitch of the lead screw 58 is made sufficiently small so as to make it possible to adjust quite accurately the position of the motor 6 and the grinding disk 3 in a radial direction. Rotation of the lead screw causes axial movement of supporting post 20 within its guide 17.

In order to grind the external surfaces of the lining of brake shoe 8, it is necessary to adjust this radial position in accordance with quite accurate measurements taken on the inside of the brake drum with which the brake shoes are to cooperate. This setting involves the use of a pin gauge arranged so that its gauging point corresponds to the grinding surface 4 of the disk 3. However, accurate gauging against an abrasive surface is not practical; the surface is not likely to be true, and other obvious difficulties are present. Accordingly, provisions are made to provide a supplemental hardened gauging surface formed of smooth metal, with which the gauge may cooperate in lieu of, or as a substitute for, the abrasive surface on the abrasive disk 4.

For this purpose as shown most clearly in Figs. 1, 2, 5 and 7, the collar 31 supports a gauging button structure. This button structure includes a thumb screw 63 (Figs. 5 and 8). This thumb screw carries a knurled head 64 and a gauge button 65 which may be smoothly finished and hardened. The axis of this screw 63 is parallel with the axis 5 of the grinder disk. By the aid of gauge marks 66 on the head of the screw, cooperating with a stationary gauge mark on the projection 67 in which the screw 63 is accommodated, the radial position of button 65 may be closely adjusted in its support, to comply with the active abrading surface.

The screw 63 is intended to be threaded into a bushing 68 accommodated in a recess in the boss 67.

In order to make it possible to prevent inadvertent rotation of the screw 63 after it has been set, this bushing 68, as shown most clearly in Fig. 8, is split. The bushing is intended to be compressed around the screw 63 as by the aid of a transversely arranged set screw 69. When it is desired to reset the gauging button 65, set screw 69 may be loosened and the screw 63 adjusted. After the adjustment is made, the set screw 69 may be tightened.

The axis of the gauging button 65 and screw 63 is spaced from the axis of the support 20 so that it overlies a clear space to the left of the shell 11, as indicated most clearly in Fig. 1. The left hand face of shell 11 is provided with an integral boss 70 (Fig. 2) in which extends an aperture 71 (Figs. 2 and 4). The axis of this aperture is shown as falling on the line 144 joining the axis 1 with the axis of the gauge screw 63. Accordingly a pin gauge 72 may be rotatably supported within the aperture 71; and for this purpose the pin gauge 72 may be provided with a transverse supporting pin 73 (Fig. 4). Thus the interior surface of aperture 71 and the surface of button 65 form gauging surfaces with which pin gauge 72 cooperates. These two gauging surfaces are so arranged that a line normal to both surface will be parallel to the line 144. The pin gauge 72 is disclosed and claimed in a copending application filed in the name of Hjalmar Thomason on December 27, 1938, under Serial No. 247,774, and entitled "Adjustable pin gauge."

In using the pin gauge 72, it is set to the desired diameter to be ground. Then this setting is transferred in the manner illustrated in Fig. 1 to the gauge button 65. This gauge button 65 is adjusted, in a manner to be hereinafter described, to correspond as closely as possible with the radius of the surface that would be ground by the abrasive member 4; and this adjustment is accomplished after a test grind. Supplemental adjustment, as the abrasive material wears, is also contemplated, so that button 65 as closely as possible, may serve as a substitute gauging surface in lieu of the abrasive surface.

When the grinding equipment is intended to be utilized in connection with wide brake shoe linings, such as indicated at 74 in Fig. 7, the use of a disk grinder is not practical. Under such circumstances the motor 6 is arranged to support a roller type of grinder wheel 75, and the axis 76 of the roller is arranged parallel with the axis 1 of the axle 2.

The readjustment of the motor supporting member 33 to accomplish this result is quite simple. The collar 45 of the motor 6 is slipped off the vertical extension 46 after the screw 54 (Fig. 3) has been turned in loosening direction. Then the support 33 may itself be loosened within the collar 31 by aid of the screw 41. The support 33 may then be adjusted to the position illustrated in Fig. 7 within the collar 31 of bracket 27, and the collar 45 may be attached to the support 33 in the position illustrated in that figure; or in any axial position along the support 33, as required by the position of the work.

In order to set the grinding surface of the wheel 75 to the desired radial position, the pin gauge 72 is again utilized. However, due to the difference in the radial position of the grinding surface of wheel 75 as compared with the grinding position of the disk 4, a different gauging surface must be used. For this purpose a gauge screw arrangement 77 (Figs. 1, 2 and 7) is utilized, similar to the screw 63. This screw arrangement is similarly supported on the rib 78 of the bracket 27. Its gauging button 79 is higher than the gauging button 65; but somewhat lower than the grinding surface of roller 75, and the pin gauge 72 is arranged to cooperate with an aperture 80 (Fig. 2) in a boss 81 on the guiding shell 11. The line 143 joining the axis of aperture 80 and the axis of screw 77 is parallel but offset from the line 144 joining the axis of the aperture 71 and the axis of screw 63. Measured along this line 143, the distance from the axis of the aperture 80 to the plane normal to lines 143 and 144 and passing through axis 1, is less than the distance from the axis of aperture 71 to the axis 1. The vertical distance however between the axis of aperture 80 and the gauge button 79 on screw 77, is intended to be such that by the aid of this gauging surface, the pin gauge setting to button 79 accurately corresponds to the radial separation of the axis 1 and the grinding surface of roller 75.

A boss 145 (Figs. 1, 7, 9 and 17) is disposed on the right hand edge of shell 11, and has an aperture 146 coxial with aperture 71 in boss 70. Pin gauge 72 can optionally be used with aperture 146 to cooperate directly with the grinding element 4 or 75. Of course this cooperation is only possible before the shell 11 is inserted over axle 2.

The manner of use of the apparatus may now be set forth. First of all, the pin gauge 72 is utilized to measure the internal diameter with which the brake shoes are to cooperate. Then with this setting, the pin gauge 72 is inserted in aperture 146 before shell 11 is inserted on axle 2. Then lead screw 58 is operated so that the radial position of the wheel 4 or 75 corresponds to the end of the gauge. The shell 11 is then placed in position on axle 2, and a trimming operation performed on the brake shoes. The outside diameter of the ground shoes is then accurately gauged; pin gauge 72 is set to correspond to this gauging; and without disturbing the setting of the lead screw 58, the button 65 or 79 is adjusted to comply with the pin gauge setting, with the pin gauge 72 supported by aperture 71 or 80. The button now accurately corresponds to the respective grinding surface of wheel 4 or 75. Now the pin gauge 72 may be set accurately to the desired trim diameter, and placed in cooperative position with respect to aperture 71 or 80. The grinder mechanism is then adjusted to the proper position defined by the pin gauge 72 by manipulation of the lead screw 58.

If the resultant outside diameter is correct, a stop collar 82, splined to the post 19, is moved down to contact with the top surface of the boss 17 and there tightened in place as by a set screw 83. This collar 82 thus limits the inward movement of the grinder wheel 4 or 75, once the grinding adjustment is made. The mechanism is now set, and can be used to grind brake shoes to the desired predetermined size. The entire mechanism may be removed from the axle 2 in its gauged position, and re-assembled in connection with any other axle of the automobile without any further setting of the lead screw 58, if the drums for the other axles happen to be trued to identical diameters.

In connection with the use of the lead screw 58 in threaded aperture 61, this lead screw 58 must of necessity have a back lash. The collar 82, however, operates to prevent any inaccuracy that may otherwise occur due to this back lash. Thus the collar 82 prevents inward movement of the grinder, and since the screw 58 has been moved inwardly to the set position, there is no back lash permitting outward movement. Accordingly the grinder mechanism may be turned in a complete circle during the grinding operation without danger that gravity would act to destroy the accurate setting produced by the use of the gauging surfaces.

Several forms of guiding supports or chucking devices for the guiding shell 11 are illustrated in Figs. 9 to 18 inclusive. In the form illustrated in Figs. 9 to 14, the axle 2 is shown as having a tapered extremity 84. The guiding support includes a ring 85 which is arranged at the right hand end of the chucking device. Extending radially through this ring 85 are a number of plungers 86, three being indicated in the present instance, and equiangularly spaced around axle 2. These plungers have rounded inner points 87' adapted to cooperate with and firmly grip the portion 84 of axle 2. They are arranged to be simultaneously urged radially inwardly by the aid of a clamping ring 87 surrounding the ring 85 and having clearance thereover. This ring 87 has an internal conical or tapered surface 88 adapted to cooperate with the sloping end surfaces 89 of the plungers 86. As most clearly indicated in Fig. 9, urging of the ring 87 toward the right will cause engagement between the tapered surface 88 and the surfaces 89 to urge the plungers 86 inwardly.

For advancing the ring 87 in this manner, use is made of a ring 90 threaded on the ring 85. As shown most clearly in Fig. 14, the ring 90 has a flange 91 overlapping a flange 92 of the ring 87. The internal diameter of flange 91 has a running fit over the external diameter of the flange 92. Accordingly, rotation of the ring 90 in one direction will cause an axial advance towards the right, of the clamping ring 87.

In order positively to retract the ring 87, the flanges 91 and 92 may be joined together as by the aid of a spring ring 93. This spring ring is shown to best advantage in Figs. 13 and 14. It is provided with a series of enlargements 94 which extend into the internal groove 95 in the flange 91. The main body of the ring is accommodated in a cooperating groove 96 in the external surface of the flange 92. The spring ring 93 thus acts as a key betwen the rings 90 and 87.

The ring 93 is split, having ends 97 and 98 as illustrated in Fig. 13. However, due to its resilience, the rings 87 and 90 may be separated by the exertion of a sufficient separating force, causing the ring 93 to be forced into groove 96. After the rings are thus separated, the spring ring 93 may be removed by the aid of a screw driver or other tool, as by the provision of cutout portions 99 in the flange 92.

In order to facilitate turning of the ring 90 for operating the clamping ring 87, this ring may be provided with a series of recesses 100 for the accommodation of a spanner wrench.

Furthermore, the external surfaces of rings 90 and 87 are accurately machined to serve as a guiding surface for the internal cylindrical surface 12 of shell 11.

In order to make it possible to accommodate the chucking device to different diameter axles, plungers 86 may be removed and replaced with shorter or longer plungers. These plungers 86 are shown as being restrained frictionally within the radial apertures in ring 85. For this purpose ball restraints 101 may be used (Fig. 9). These balls are each arranged in guiding apertures 102, having axes transverse to the axis of the corresponding plunger 86. A screw 103 plugs the aperture 102, and a compression spring 104 therein acts to urge the ball 101 into contact with the groove or spline 105 provided in each of the plungers 86. The coaction of the ball 101 and the spline 105 serves also to ensure that the slanting surfaces 89 at the outer ends of the plungers 86 will be in proper cooperative position with the tapered surface 88. The balls 101 may be restrained against axial removal from apertures 102 as by slightly upsetting the right hand edges of these apertures.

The chucking device contemplates the use of an axially spaced guiding surface so as to provide a wide bearing for the shell 11. For this purpose another ring 105' (Figs. 9 and 10) is shown of the same construction as ring 85. It is, however, axially adjustable with respect to ring 85 as by being slidably mounted on a series of guiding rods 106. These guiding rods are press-fitted into the ring 85 at their right hand ends, and extend in a direction parallel to the axis 1. In the present instance six such rods 106 are shown, in sets of two, equi-angularly disposed around the axis 1. At the left hand end these rods 106 may be joined by another ring 107 as by the aid of set screws 108. Set screws 108 may be utilized in connection with only some of these guiding rods; as for example, with alternate rods 106. The external diameter of the ring 107 also acts as a guiding surface for the shell 11.

The ring 105' accommodates plungers 109 of similar construction to the plungers 86, and similarly radially movable inwardly. For this purpose the ring 110 is threaded on the ring 105', and cooperates with the clamping ring 111, having the internal tapered surface 112. In other respects, the operation of the plungers 109 and their ball restraints is entirely similar to that described in connection with ring 85. The exterior surface of rings 110 and 111 serve as additional guiding surfaces for the shell 11.

In using the device, the ring 85 and the ring 105' are first axially separated to comply with the size and length of the axial extension 84. The plungers 86 and 109 are chosen of the correct length to comply with the axle surfaces to be gripped by the plungers. Then the clamping rings 87 and 111 may be operated as heretofore described, to maintain the chucking devices tightly in place on the axle extension.

It is desirable that the shell 11 be strained from axial movement and confined merely to an angular movement when it is disposed over the guiding surfaces described. For this purpose a ball restraint 113 (Figs. 9 and 12) may be utilized. This ball restraint is shown as capable of cooperating with either of the two internal grooves 114 or 115, arranged near the left hand end of the shell 11. It is carried in an aperture 116 (Fig. 12) in the ring 107 and may be held against removal as by properly upsetting the edges of the aperture 116.

The ball 113 is permitted to move inwardly within the aperture 116 when the shell 11 is disposed over the guiding surface; but after either one of the grooves 114 or 115 is placed in alignment with the ball 113, the ball 113 may be urged radially outwardly, and there restrained against inward radial movement. For this purpose, use is made of a plug 117 rotatable in an aperture 118 disposed in the ring 107. This aperture 118 intersects the aperture 116. The plug 117 is provided with a flat surface 119, as well as a handle 120. With the plug 117 in the position of Figs. 9 and 12 the exterior cylindrical surface of the plug is arranged to cooperate with the ball 113 to restrain its inward movement. However, when the handle 120 is moved so as to rotate the plug 118 through a half revolution, the flattened portion 119 comes opposite the ball 113 and permits it to move inwardly in the aperture 116.

The plug 120 is restrained against removal from the aperture 118 as by the upset projection 121. Stop limits are also imposed upon the handle 120 as by the aid of the stop pins 122 and 123 (Fig. 11) disposed in proper position on the ring 107. Either groove 114 or 115 may be chosen as desired to cooperate with ball 113, so that if desired some variation in the axial position of shell 11 on its guide is permitted.

In the form illustrated in Figs. 9 to 13, the guiding rods 106 have been described as a guiding means as well as means for accurately aligning the rings 85 and 105'. However, it is possible to use other forms of guiding means. In the form illustrated in Figs. 15 and 16, for example, the rods 106 are dispensed with. Instead, ring 124 at the right hand end of the chucking device, corresponding to ring 85 in the first form, is shown as having three integral arcuate extensions 125, forming an interrupted exterior cylindrical surface, as shown most clearly in Fig. 16. Radial slots 126 separate these arcuate extensions. The left hand end of the structure is provided with an integral ring 127. The slots 126 are accurately machined, and extend through the ring 127. The exterior surface of this ring 127 corresponds to the exterior guiding surface of the ring 107 in the form illustrated in Fig. 9.

The ring 128, corresponding to ring 105' of the first form, is shown as provided with three inwardly directed integral projections 129 accurately guided in the slots 126. This ring 128 is therefore axially adjustable with respect to ring 124, and is supported on the exterior cylindrical surfaces of the arcuate portions 125. The clamping rings 129, 130 and plungers 131, 132, operate as in the form illustrated in Fig. 9.

In the forms thus far described, the maximum diameter of the axle 2 upon which the chucking device may be supported, is limited by the internal diameter of the interrupted tubular structure formed by the arcuate segments 125, or the internal diameter of the rings 85 or 105' in the form illustrated in Fig. 9. In the event that larger axles are encountered, another manner of supporting the shell 11 may be utilized. Such a form is illustrated in Figs. 17 and 18. In this form of the invention, the axle 133 is shown as of quite large diameter, and as provided with axially spaced cylindrical portions 134 and 135. In this form, rings 136 and 137 are utilized, forming exterior cylindrical surfaces for guiding rotation of the shell 11. Each of these rings is provided with an internal tapered surface 138 or 139 cooperating with correspondingly tapered external surfaces of the split resilient rings 140 and 141. These split rings are compressed around the cylindrical surfaces 134 and 135 when the two tapered surfaces are in engagement. By providing different sets of split rings 140, 141, having different internal diameters, the devices can be accommodated to various sizes of the axle 133. In using this form of the device, the split rings 140 and 141 are first placed over the cylindrical portions of the axle 133. Then the ring 136 is driven over the split ring 140; and similarly the ring 137 is driven over the split ring 141. The shell 11 may then be telescoped over these rings 136 and 137 as illustrated in Fig. 17.

What is claimed is:

1. In a device of the character described, a grinder wheel, and means for mounting said wheel for angular movement about the axis of an axle so that the grinding surface of the wheel describes a surface of revolution about said axis, comprising a member adjustable in a direction radial to said axis for adjusting the radius of the said surface of revolution, and supporting an arm with a shank parallel to said axis, as well as an extension perpendicular thereto, said member being adapted optionally to support said grinder wheel either on the shank or on the extension so that the wheel axis is radial to the axis of the axle, or parallel thereto.

2. In a device of the character described, a grinder structure having a support adapted to carry either a disc grinder wheel or a roller grinder wheel, and adapted to be moved angularly about the axis of an axle, said grinder structure having provisions whereby the axis of the grinder wheel may be supported either radial to the axle, or parallel thereto, whereby respectively the disc grinder wheel or the roller grinder wheel may be utilized with the same structure, and in which the grinding surface of the disc wheel is at a different distance from the axis than the grinding surface of the roller wheel, gauging means including gauging surfaces for adjusting the radial position of the grinder with respect to said axis including means forming gauging surfaces cooperating for adjusting the position of the disc grinder wheel with respect to said axis, one of said gauging surfaces being capable of being fixed radially with relation to the grinding surface of said disc wheel, and means forming gauging surfaces cooperating for adjusting the position of the roller grinder wheel with respect to said axis, one of said latter gauging surfaces being capable of being fixed radially with relation to the grinding surface of said roller grinder wheel, one of said gauging surface forming means lying in a radial line through the axis, the other gauging surface forming means being parallel to said line and offset therefrom.

3. In a device of the character described, a roller grinder wheel structure, and means for mounting said wheel structure for angular movement about the axis of an axle so that the grinding surface of the wheel describes a surface of revolution about said axis, including an arm with a shank as well as an extension perpendicular thereto, said arm being adapted to support the wheel structure either on the shank or on the extension, whereby the wheel axis is radial to the axle axis or perpendicular thereto, the wheel structure being adjustable along said shank and parallel with the axle axis.

4. In a device of the character described, a rotary grinder mechanism adapted to drive a wheel having a grinding surface, means for mounting said mechanism for angular movement about the axis of an axle so that the grinding surface describes a surface of revolution about said axis, comprising a member adjustable in a direction radial to said axis for adjusting the radius of said surface of revolution and supporting an arm with a shank parallel to said axis as well as an extension perpendicular thereto, said arm being adapted optionally to support said mechanism whereby the axis of the grinder wheel is parallel with the axle axis, or perpendicular thereto, either on the shank or on the extension, and gauging means including a pair of spaced gauging surfaces carried by said member for respectively facilitating the positioning of the grinding surface radially with respect to said axle axis in accordance with the position of the axis of the grinder wheel.

5. In a device for performing a cutting operation upon an article, a rotary cutting member presenting a rotating cutting surface to a surface of the article, a support for the cutting member, means for adjusting the relative position of said article and the support for determining a dimension of said article by operation of the cutting member, and means for facilitating the relative positioning of said cutting member and the article, comprising a pair of means forming respectively a pair of cooperating gauging surfaces, one of said gauging surfaces being associated with said support to have a definite relative position with respect to the effective surface of operation defined by the rotating cutting surface of the member, and forming a substitute gauging surface for said surface of operation, said gauging surfaces being adapted to cooperate with a gauging means.

6. In a device for performing a cutting operation upon an article, a rotary cutting member presenting a rotating cutting surface to a surface of the article, a support for the cutting member, means for adjusting the relative position of said article and the support, said adjustment being in a linear direction normal to the surface being ground, and means for facilitating the relative positioning of said cutting member and the article, comprising a pair of means forming a pair of cooperating gauging surfaces, one of said gauging surfaces being associated with said support to have a definite relative position with respect to the effective surface of operation defined by the rotating cutting surface of the member, and the other gauging surface being in definite relative position with respect to the article, said gauging surfaces being such that a line normal to both gauging surfaces is parallel to the said linear direction of adjustment.

7. In a device for performing a cutting operation upon an article, a rotary cutting member presenting a rotating cutting surface to a surface of the article, a support for the cutting member, means for adjusting the relative position of said article and the support for determining a dimension of said article by operation of the cutting member, and means for facilitating the relative positioning of said cutting member and the article, comprising a pair of means forming respectively a pair of cooperating gauging surfaces, one of said gauging surfaces being associated with said support to have a definite relative position with respect to the effective surface of operation defined by the rotating cutting surface of the member, and forming a substitute gauging surface for said surface of operation, said gauging surfaces being adapted to cooperate with a gauging means, and means for altering the position of at least one of said gauging surfaces with respect to the element with which said gauging surface is associated.

8. In a device for performing a cutting operation upon an article, a rotary cutting member presenting a rotating cutting surface to a surface of the article, a support for the cutting member, means for adjusting the relative position of said article and the support, said adjustment being in a linear direction normal to the surface being ground, means adapted to be associated with the article and with which said adjusting means cooperates so that the said relative adjustment may be made between the adjusting means and said means associated with the article, and means for facilitating the relative positioning of said cutting member and the article, comprising a pair of means forming a pair of cooperating gauging surfaces, one of said gauging surfaces being associated with said support to have a definite relative position with respect to the effective surface of operation defined by the rotating cutting surface of the member, and the other gauging surface being in definite relative position with respect to the article, said gauging surfaces being such that a line normal to both gauging surfaces is parallel to the said linear direction of adjustment, and means for altering the position of at least one of said gauging surfaces with respect to the element with which said gauging surface is associated.

9. In a device for performing a cutting operation upon the convex surface of an arcuate article, a rotary cutting member presenting a rotating cutting surface to the convex side of said article, a support for the cutting member, means cooperating with said article whereby relative angular movement of the axis of the cutter member and the convex surface of the article may be accomplished for cutting a surface of revolution on said article, said means including an adjustable mechanism for the support for adjusting the radius of the arcuate surface to be cut, and means for facilitating the relative positioning of said cutting member and the article to determine the radius of the cut, comprising a pair of means forming respectively a pair of cooperating gauging surfaces, one of said gauging surfaces being supported on said support to have a definite relative position with respect to the effective surface of operation defined by the rotating cutting surface of the cutting member, and the other gauging surface being in definite radial position with respect to the axis of the article, and supported on said means whereby relative angular movement may be accomplished, said gauging surfaces being such that a line normal to both gauging surfaces is parallel to the direction of adjustment provided by the adjustable mechanism.

10. In a device for performing a cutting operation upon the convex surface of an arcuate article, a rotary cutting member presenting a rotating cutting surface to the convex side of said article, a support for the cutting member, means cooperating with said article whereby relative angular movement of the axis of the cutter member and the convex surface of the article may be accomplished for cutting a surface of revolution on said article, said means including an adjustable mechanism for the support for adjusting the radius of the arcuate surface to be cut, and means for facilitating the relative positioning of said cutting member and the article to determine the radius of the cut, comprising a pair of means forming respectively a pair of cooperating gauging surfaces, one of said gauging surfaces being supported on said support to have a definite relative position with respect to the effective surface of operation defined by the rotating cutting surface of the cutting member, and the other gauging surface being in definite radial position with respect to the axis of the article, and supported on said means whereby relative angular movement may be accomplished, said gauging surfaces being such that a line normal to both gauging surfaces is parallel to the direction of adjustment provided by the adjustable mechanism, and means for altering the position of at least one of said gauging surfaces with respect to the element upon which it is supported.

11. In a device of the character described, a rotary cutting member, means for mounting said member for angular movement about the axis of an axle so that the cutting surface of the member describes a surface of revolution about said axis, means for adjusting the position of said cutting surface in a direction radial to said axis, means forming spaced gauging surfaces which cooperate for setting the cutting surface of said member to a definite radius with respect to said axis, one of said gauging surfaces forming a substitute gauging surface for said cutting surface and being capable of being fixed in relation to the cutting surface, and means for adjusting said fixed relation.

HJALMAR THOMASON.